April 2, 1929.  J. E. McBRIDE  1,707,359
CONVEYER
Filed Aug. 21, 1922   2 Sheets-Sheet 1

Inventor
Jesse E. McBride

Attorneys

Inventor
Jesse E. McBride

Patented Apr. 2, 1929.

1,707,359

UNITED STATES PATENT OFFICE.

JESSE E. McBRIDE, OF DETROIT, MICHIGAN, ASSIGNOR TO PALMER-BEE COMPANY, OF DETROIT, MICHIGAN, A CORPORATION OF MICHIGAN.

CONVEYER.

Application filed August 21, 1922. Serial No. 583,305.

The invention relates to conveyers and more particularly to platform conveyers. The invention has for some of its objects to provide a platform conveyer in which the slats forming the conveyer platform are secured to the attachment links of the conveyer chains in their central planes; and in which the conveyer chains are supported by rollers offset laterally from the chain links and platform slats to permit the rollers to return upon lower tracks which are similar to the upper tracks without interfering with the turning over of the platform slats upon their return. Other objects are to provide a conveyer in which the shafts upon which the rollers are mounted are non-rotatably secured to the attachment links of the chains; to provide non-rotatable bushings upon the shafts for the rollers; and to provide a readily accessible construction for lubricating the rollers. A further object is the provision of a novel construction of attachment link.

With these and other objects in view, the invention resides in the novel features of construction and combinations and arrangements of parts as more fully hereinafter set forth.

Figure 2:
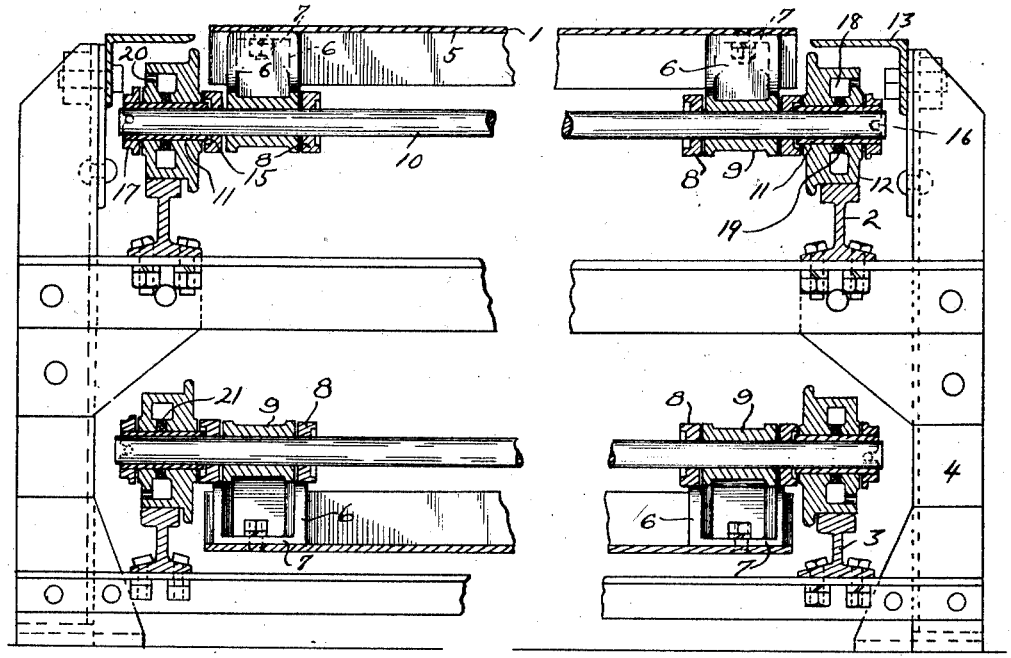
Figure 2 is an end elevation partly in section of the conveyer mounted upon the tracks.
Figure 1:
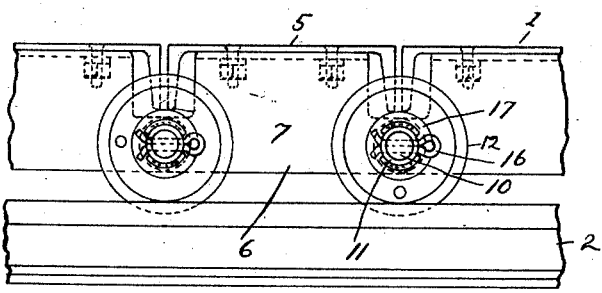
Figure 1 is a side elevation of a portion of a conveyer embodying my invention.

1 is the platform conveyer mounted to run on the upper and lower tracks 2 and 3 respectively which are mounted upon a suitable frame 4. The platform for the conveyer is formed by slats 5 preferably of channel cross section which extend across and are secured to the parallel conveyer chains comprising the series of pivotally connected links 6, the webs of the slats constituting the supporting platform and their parallel sides extending downward.

For the purpose of securing a substantially continuous platform, it is desirable that the slats 5 should extend in close proximity to each other. However, since the conveyer must pass around sprockets at its ends, it is necessary to avoid interference between the slats when the links are in angular relation to each other. With my construction of link, this is provided for.

Each link 6 comprises an intermediate channel-shaped portion 7 and the pivot portions 8 and 9 at opposite ends and near the edge opposite the web of the channel. The pivot portion 8 comprises the separated hubs upon the side flanges of the link, while the pivot portion 9 comprises the opposite end portions of the side flanges, and the barrel formed at the end of the web of the channel. The length of the pivot portion 9 is such that it fits between the hubs forming the pivot portion 8 of the connecting link and its aperture registers with the apertures through these hubs. The slats 5 embrace the intermediate channel-shaped portions 7 of the links and the webs of the slats are secured to the webs of the links by suitable means, such as stove bolts, in the central planes of the links and consequently in the central planes of the conveyer chains. The side flanges of the slats extend in close proximity to each other and terminate above the axes of the pivot portions. The sprockets at the ends of the conveyer engage the pivot portions 9.

With this arrangement, a substantially continuous platform formed of channel-shaped slats which do not interfere with each other, is secured. Also, the means for securing the slats to the links of the chains are in the central planes of the chains. In addition, since the sprockets engage a pivot portion of each link, the stresses in moving the conveyer through its path are directly transmitted through the links.

The pivots for connecting adjacent ends of the links 6 comprise shafts 10 passing through the aligned apertures in the pivot portions 8 and 9. 11 are bushings upon the opposite ends of the shafts, and 12 are flanged rollers rotatably mounted upon the bushings and adapted to roll upon the upper and lower tracks 2 and 3 respectively, which are similar. These rollers are laterally offset beyond the ends of the slats 5 whereby the conveyer may freely pass over the end sprockets and turn over. Furthermore, with this relation of rollers, conveyer chains and platform slats, guard angles 13 may be arranged upon the frame 4 above the path of travel of the rollers.

Each shaft 10 is held from rotation relative to the pivot portions 8 of the links 6 by forming diametrically opposite recesses 14 in the outer sides of the hubs forming the pivot portions and by forming projections or teeth 15 upon the inner ends of the bushings 11, which engage in the recesses 14, and also by passing cotter keys or the like 16 through the outer ends of the shafts and the bushings. These cotter keys also pass through the flanged washers 17 which retain the rollers 12 upon the shafts. The openings in the bushings and washers through which the cotter keys extend, are preferably open-ended. The rollers 12 are cored to form the interior annular recesses 18 and radial passages 19 leading to their inner bearing faces. These interior recesses may be filled with lubricant through the plugged openings 20 and the lubricant is then conducted to the bearing faces between the rollers and the bushings by suitable means such as the wicks 21.

With this arrangement, the shafts constituting the pivots for connecting adjacent ends of the links are held from rotation as are also the bushings upon the shafts. The rollers rotate upon the bushings, but has interior chambers which may be filled with lubricant for lubricating the bearing surfaces between the rollers and bushings. Repairs may be readily made to the rollers and bushings without the necessity of dismantling the conveyer chains. Furthermore, the construction is such that the rollers are readily accessible for lubricating purposes.

Figure 5:
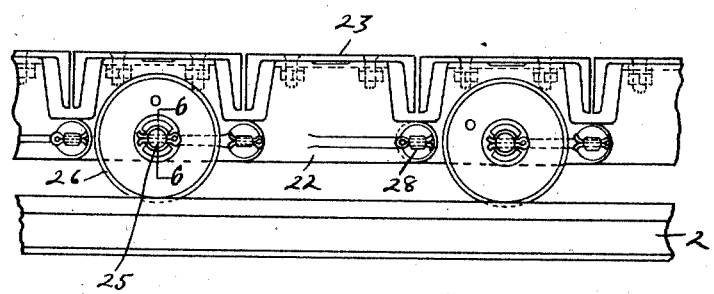
Figure 5 is a side elevation of a modified construction of conveyer.
Figure 3:
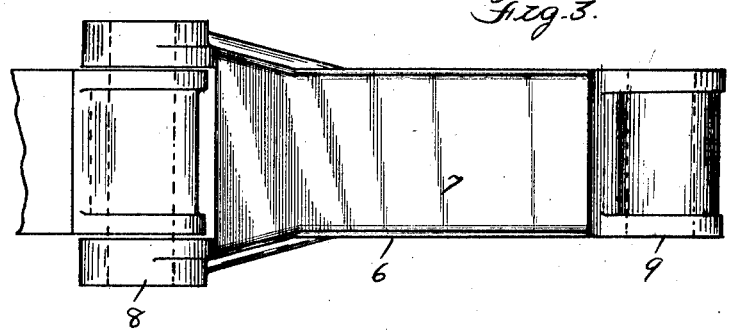
Figure 3 is a plan view of a portion of the conveyer chain.
Figure 4:
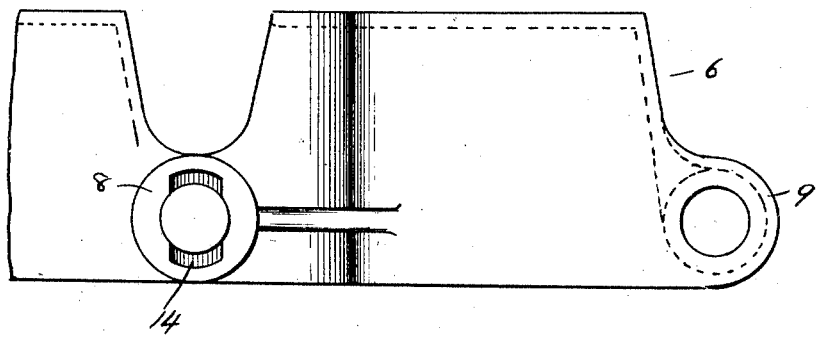
Figure 4 is a side elevation of an attachment link of the conveyer chain.
Figure 6:
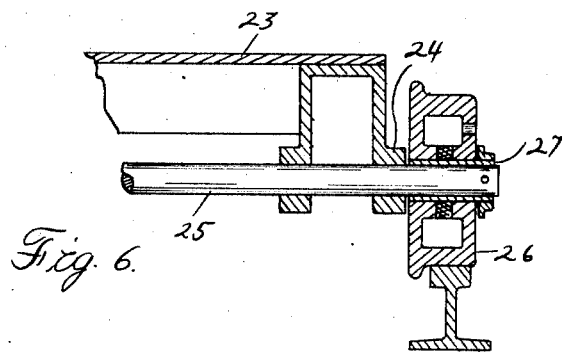
Figure 6 is a cross section on the line 6—6 of Figure 5.
Figure 7:
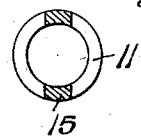
Figure 7 is an end view of a roller bushing.

In the modified construction of conveyor as shown in Figures 5 and 6, the arrangement of links 22 and platform slats 23 is the same as that shown in Figures 1 to 4 inclusive with the exception that alternate links are provided with the hubs 24 intermediate the ends of their side flanges provided with aligned apertures through which the shafts 25 pass. The rollers 26 are rotatably mounted upon bushings 27 which in turn are mounted upon the ends of the shafts 25. These shafts and bushings are nonrotatably secured to the hub upon the outer side flange of the link in the same manner that the shafts 10 and bushings 11 are nonrotatably secured to the hub upon the outer side flange of the link 6. The pivot portions of the links are suitably connected by pins 28. With this construction, a substantially continuous platform is provided with only half the usual number of shafts and rollers, the arrangement being such that the slats between the slats supported by the rollers are supported with scarcely any deflection under load.

Still another important advantage secured by my construction of conveyer is the supporting of the load carrying rollers upon tracks which extend to the center line of the head shaft instead of adjacent to the edges of the sprockets engaged by the conveyer chains.

What I claim as my invention is:

1. In a conveyer, the combination with substantially parallel chains comprising attachment links each having pivotally connected end portions and an integral intermediate channel-shaped portion, of channel-shaped slats extending across and embracing said intermediate channel-shaped portions and secured thereto, the side flanges of said channel-shaped slats extending adjacent to each other and terminating above the axes of the link pivots.

2. In a conveyer, the combination with a chain comprising attachment links each having pivotally connected end portions and an intermediate channel-shaped portion, of channel-shaped slats extending transversely of and embracing said channel-shaped portions, the webs of said slats being secured to the webs of said channel-shaped portions in the longitudinal central planes of said links, shafts constituting the pivots for said links, and rollers upon the outer ends of said shafts beyond the opposite ends of said slats.

3. In a conveyer, the combination with a chain comprising pivotally connected links, of slats extending transversely of and secured to said links, shafts extending transversely through said links, means for nonrotatably securing each of said shafts to a link, and rollers upon said shafts.

4. In a conveyer, the combination with a chain comprising pivotally connected links, of slats extending transversely of and secured to said links, shafts extending transversely through said links, bushings upon the outer ends of said shafts and nonrotatably secured thereto, means for nonrotatably securing said bushings to a link, and rollers journalled upon said bushings.

5. In a conveyer, the combination with a chain comprising a series of links pivotally connected at their ends, load carrying members extending transversely of and secured to said links, shafts extending transversely through said links, and constituting their pivots, means for nonrotatably securing each shaft to one of said links through which it passes, and rollers upon said shafts.

6. In a conveyer, the combination with a chain comprising a series of links pivotally connected at their ends, of load carrying members extending transversely of and secured to said links, shafts extending transversely through said links and constituting their pivots, bushings upon the ends of said shafts, and nonrotatably secured thereto, means for nonrotatably securing each of said bushings to one of the links through which the respective shaft passes, and rollers journalled upon said bushings.

In testimony whereof I affix my signature.

JESSE E. McBRIDE.